US010935567B2

(12) United States Patent
Kawano

(10) Patent No.: US 10,935,567 B2
(45) Date of Patent: Mar. 2, 2021

(54) PHYSICAL QUANTITY SENSOR, ELECTRONIC DEVICE, AND VEHICLE

(71) Applicant: Seiko Epson Corporation, Tokyo (JP)

(72) Inventor: Shuichi Kawano, Suwa (JP)

(73) Assignee: Seiko Epson Corporation

( * ) Notice: Subject to any disclaimer, the term of this patent is extended or adjusted under 35 U.S.C. 154(b) by 225 days.

(21) Appl. No.: 16/118,960

(22) Filed: Aug. 31, 2018

(65) Prior Publication Data

US 2019/0072580 A1 Mar. 7, 2019

(30) Foreign Application Priority Data

Sep. 1, 2017 (JP) .............................. JP2017-168289

(51) Int. Cl.
| | | |
|---|---|---|
| *G01P 15/125* | (2006.01) | |
| *G01C 19/00* | (2013.01) | |
| *G01P 15/08* | (2006.01) | |
| *G01C 19/5705* | (2012.01) | |

(52) U.S. Cl.
CPC .......... *G01P 15/125* (2013.01); *G01C 19/00* (2013.01); *G01C 19/5705* (2013.01); *G01P 2015/0814* (2013.01)

(58) Field of Classification Search
CPC .......... G01P 15/125; G01P 2015/0814; G01C 19/00; G01C 19/5705
See application file for complete search history.

(56) References Cited

U.S. PATENT DOCUMENTS

| 9,068,835 | B2 | 6/2015 | Yoda et al. | |
|---|---|---|---|---|
| 9,086,428 | B2 | 7/2015 | Yoda et al. | |
| 2009/0267165 | A1* | 10/2009 | Okudo | B81C 1/00269 257/415 |
| 2009/0289315 | A1* | 11/2009 | Sawai | H01L 29/84 257/419 |
| 2012/0111615 | A1 | 5/2012 | Yoda et al. | |
| 2012/0267150 | A1* | 10/2012 | Yoda | G01C 19/5783 174/257 |

FOREIGN PATENT DOCUMENTS

| JP | 2012-098208 A | 5/2012 |
|---|---|---|
| JP | 2012-225803 A | 11/2012 |
| JP | 2014-016165 A | 1/2014 |
| JP | 2014016165 A * | 1/2014 |
| JP | 2014-185882 A | 10/2014 |

OTHER PUBLICATIONS

English translation for JP-2014016165-A. (Year: 2014).*

* cited by examiner

*Primary Examiner* — Xin Y Zhong
(74) *Attorney, Agent, or Firm* — Harness, Dickey & Pierce, P.L.C.

(57) ABSTRACT

In a physical quantity sensor, wirings provided on a projection and a bonding pad form a silicide layer and are electrically connected. The wirings are multilayered films. A noble metal layer covers the projection and contacts the bonding pad to form the silicide layer. A metal layer extends between the noble metal layer and a base substrate. The metal layer, the noble metal layer, an adhesion layer, and an insulating layer are stacked in this order from the base substrate in all areas except for atop the projection.

18 Claims, 12 Drawing Sheets

PHYSICAL QUANTITY SENSOR, ELECTRONIC DEVICE, AND VEHICLE

BACKGROUND

1. Technical Field

The present invention relates to a physical quantity sensor, an electronic device, and a vehicle.

2. Related Art

A known physical quantity sensor that measures physical quantities such as acceleration and angular velocity includes a structure having a fixed electrode and a movable electrode arranged side by side with a gap with respect to the fixed electrode and displaceable in a fixed direction. With such a physical quantity sensor, the gap between the fixed electrode and the movable electrode changes in accordance with the displacement of the movable electrode and a change in electrostatic capacitance occurring between the fixed electrode and the movable electrode is measured by the change in the gap so that the changes in physical quantities such as acceleration and angular velocity are measured.

In JP-A-2014-16165, a semiconductor element (physical quantity sensor) is disclosed, in which a wiring is formed on a projection formed in a wiring groove formed on an insulating substrate (base substrate) and a silicide compound (sensor substrate) is formed at the projection so that a silicon body having a fixed electrode and a movable electrode is electrically connected to the wiring and a change in electrostatic capacitance generated between the fixed electrode and the movable electrode is output via the wiring.

However, in the physical quantity sensor described in JP-A-2014-16165, if the thickness of a wiring in contact with a sensor substrate is larger than necessary, voids (Kirkendall voids) accompanying massive atomic movement due to excessive silylation occur. Therefore, there is a problem that cracks are generated in the voids (Kirkendall voids) due to the heat at the time of bonding of the two substrates and the heat at the time of mounting onto an external substrate, the wiring is disconnected, and the reliability is remarkably deteriorated.

SUMMARY

An advantage of some aspects of the invention is to solve at least a part of the problems described above, and the invention can be implemented as the following embodiments or application examples.

APPLICATION EXAMPLE 1

A physical quantity sensor according to this application example includes a base substrate that includes a groove for forming a wiring and a projection in the groove, and a sensor substrate that includes a bonding pad connected to the wiring provided on the projection and a fixed electrode and a movable electrode for measuring a physical quantity, in which the base substrate is an insulating material, the sensor substrate is silicon, the wiring provided on the projection and the bonding pad are electrically connected by a silicide layer, the wirings are multilayered films, a noble metal layer covers the projection and the layer in contact with the bonding pad forms a silicide layer, a metal layer is between the noble metal layer and the base substrate, and the metal layer, the noble metal layer, an adhesion layer, and an insulating layer are stacked in this order from the base substrate side in the area excluding the projection.

According to this application example, since the wirings provided along the projection are multilayered films of the noble metal layer and the metal layer forming the silicide layer, it is possible to adjust the thickness of the noble metal layer and the metal layer. Therefore, by thickening the metal layer, the noble metal layer may be thinned, and therefore, excessive silylation does not occur and there are fewer moving atoms. Therefore, since no void is generated in the silicide layer, cracking hardly occurs, and the reliability of the electrical connection between the sensor substrate and the wirings may be improved. Therefore, it is possible to obtain the physical quantity sensor having high reliability.

APPLICATION EXAMPLE 2

In the physical quantity sensor described in the application example, it is preferable that the thickness of the noble metal layer is 10 nm or more and 200 nm or less.

According to this application example, since the thickness of the noble metal layer is 10 nm or more, a sufficient continuous film may be formed, and electrical connection between the sensor substrate and the wirings may be secured. In addition, the thickness of the noble metal layer is 200 nm or less, voids due to excessive silylation are hardly generated, and disconnection at the corner portions of the projection is hardly caused, and therefore, it is possible to secure the electrical connection between the sensor substrate and the wirings via the silicide layer.

APPLICATION EXAMPLE 3

In the physical quantity sensor described in the application example, it is preferable that the noble metal layer is made of one of Ru, Pt, Pd, Ir, Rh, and Os, or a plurality of these materials.

According to this application example, since the noble metal layer is made of one of Ru, Pt, Pd, Ir, Rh, and Os or a plurality of these materials, the sensor substrate and the silicide layer may be formed, and the wirings may be electrically connected with the sensor substrate.

APPLICATION EXAMPLE 4

In the physical quantity sensor according to the application example, it is preferable that the insulating layer is made of one of $SiO_2$, SiOF, SiOC, SiON, SiH, $HfO_2$, $Al_2O_3$, $La_2O_3$, $TiO_2$, $Ta_2O_5$, and DLC (Diamond•Like•Carbon), or a plurality of these materials.

According to this application example, since the insulating layer is made of one of $SiO_2$, SiOF, SiOC, SiON, SiH, $HfO_2$, $Al_2O_3$, $La_2O_3$, $TiO_2$, $Ta_2O_5$, and DLC (Diamond•Like•Carbon), or a plurality of these materials, it is possible to prevent foreign matter from adhering to the wirings and short-circuiting between the wirings and the fixed electrode.

APPLICATION EXAMPLE 5

In the physical quantity sensor described in the application example, it is preferable that the adhesion layer is made of one of Ti, TiW, W, TiN, Ta, TaW, TaN, Ni, and Co, or a plurality of these materials.

According to this application example, since the adhesion layer is made of one or more materials such as Ti, TiW, W, TiN, Ta, TaW, TaN, Ni, and Co, it is possible to improve the adhesion between the insulating layer and the noble metal layer and reduce the peeling of the insulating layer due to heat generated at the time of bonding the substrates to each other or at the time of mounting onto an external substrate.

APPLICATION EXAMPLE 6

In the physical quantity sensor described in the application example, it is preferable that the insulating layer includes two layers.

According to this application example, since the insulating layer includes two layers, it is possible to improve etching resistance in a case where the sensor substrate is formed by etching. In addition, it is possible to relieve the residual stress of the insulating layer and to reduce warping of the substrate by using two insulating layers having different materials.

APPLICATION EXAMPLE 7

An electronic device according to this application example includes the physical quantity sensor described in the application example.

According to this application example, it is possible to provide an electronic device with higher performance by using a physical quantity sensor having high measurement sensitivity for the electronic device.

APPLICATION EXAMPLE 8

A vehicle according to this application example includes the physical quantity sensor described in the application example.

According to this application example, it is possible to provide a vehicle with higher performance by using a physical quantity sensor having high measurement sensitivity for the vehicle.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Figure 1:
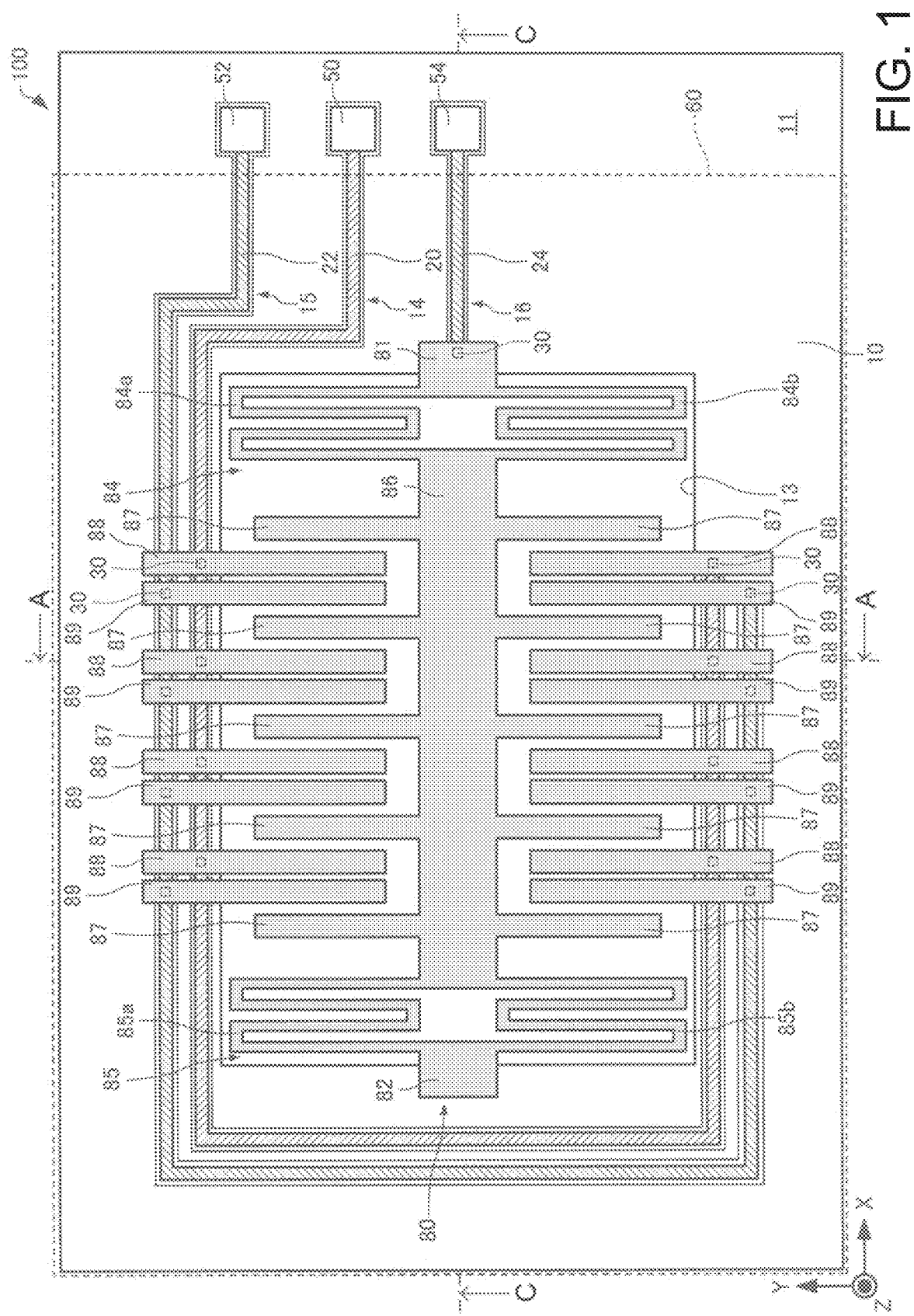
FIG. 1 is a plan view schematically showing a schematic structure of a physical quantity sensor according to a first embodiment.

Hereinafter, embodiments of the invention will be described in detail with reference to drawings. In the drawings, in order to make the constituent elements large enough to be recognized on the drawing, sometimes the dimension and ratio of each constituent element are shown as being different from the actual constituent elements.

FIRST EMBODIMENT

Structure of Physical Quantity Sensor

Figure 2:
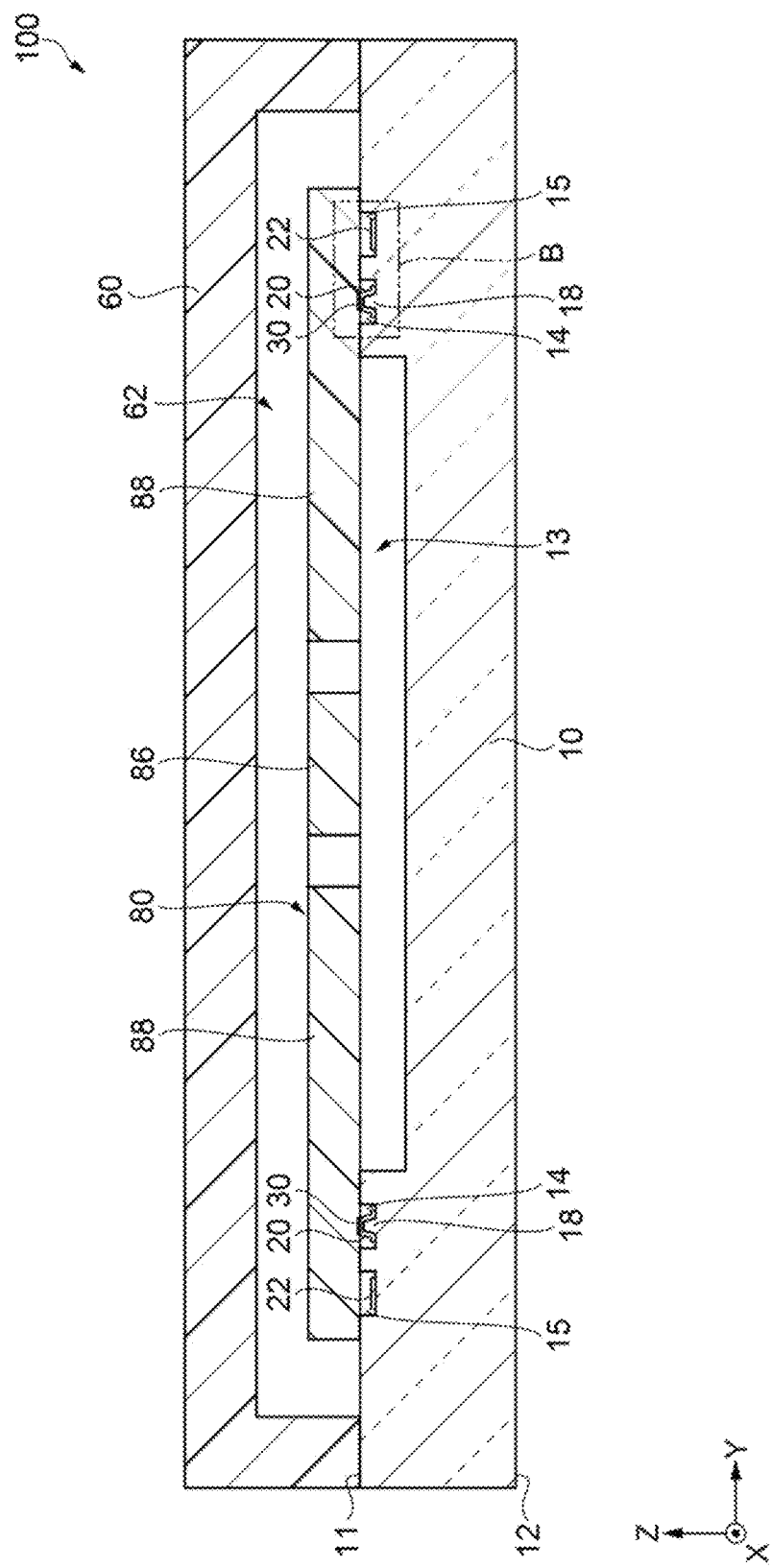
FIG. 2 is a cross-sectional view schematically showing a cross section taken along the line A-A in FIG. 1.
Figure 3:
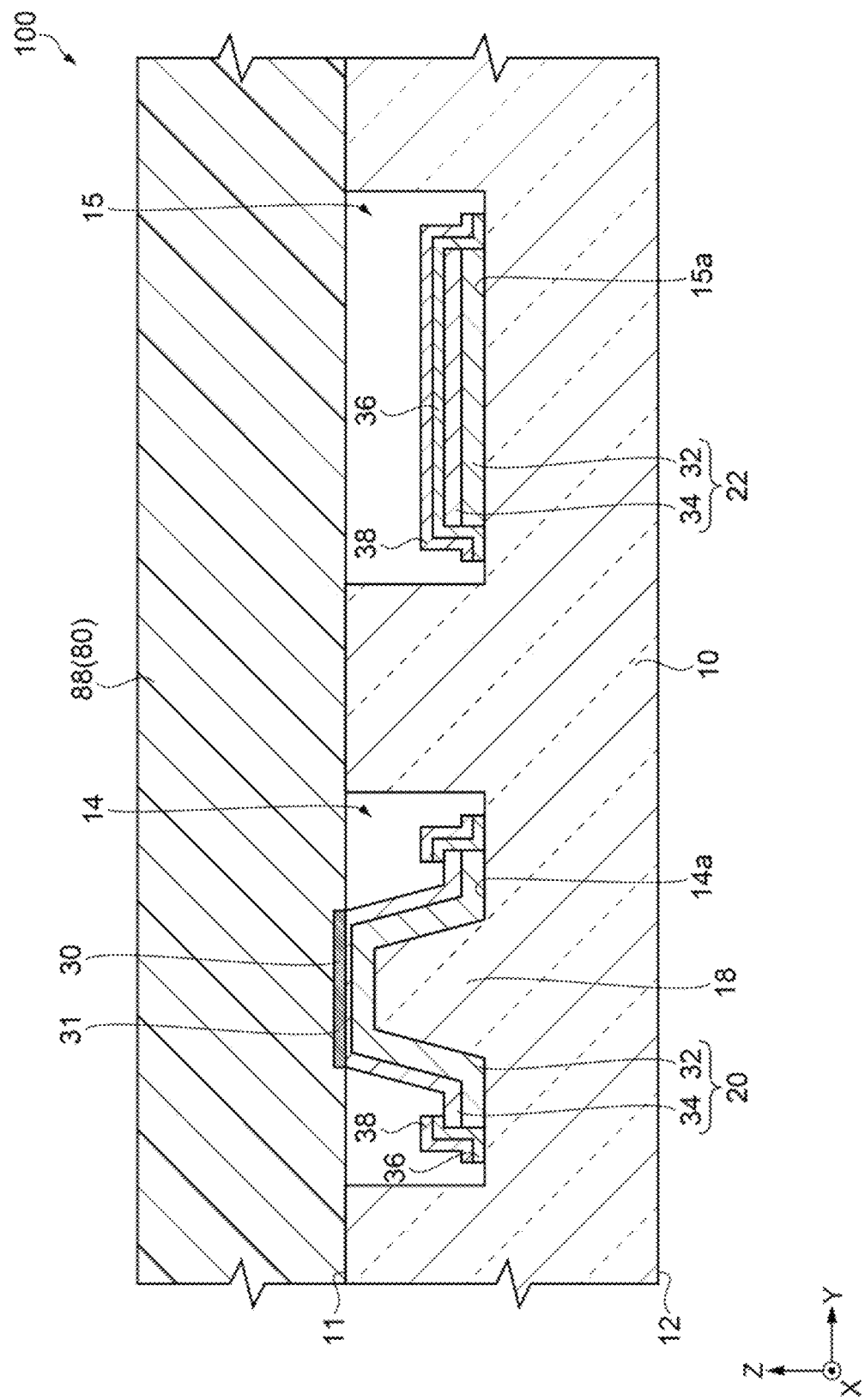
FIG. 3 is an enlarged cross-sectional view of a portion B in FIG. 2.
Figure 4:
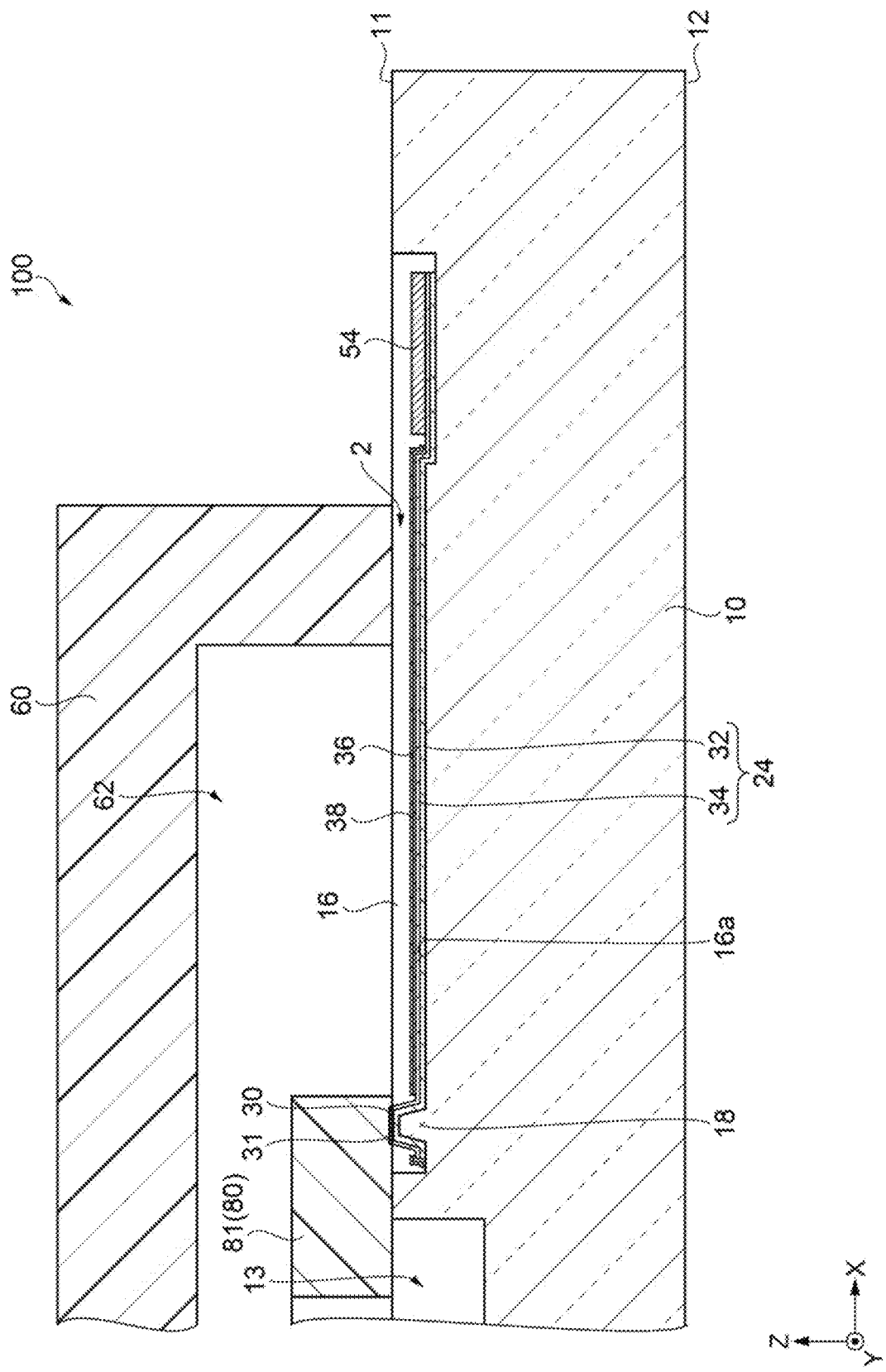
FIG. 4 is a cross-sectional view schematically showing a cross section taken along the line C-C in FIG. 1.

First, a physical quantity sensor 100 according to a first embodiment will be described with reference to FIGS. 1 to 4. FIG. 1 is a plan view schematically showing a schematic structure of a physical quantity sensor according to a first embodiment. FIG. 2 is a cross-sectional view schematically showing a cross section taken along the line A-A in FIG. 1. FIG. 3 is an enlarged cross-sectional view of a portion B in FIG. 2. FIG. 4 is a cross-sectional view schematically showing a cross section taken along the line C-C in FIG. 1. For the sake of convenience, FIG. 1 shows a lid body 60 in phantom. In addition, in FIG. 2, a metal layer 32, a noble metal layer 34, an adhesion layer 36, and an insulating layer 38 are omitted. Furthermore, in FIGS. 1 to 4 and FIGS. 5 to 9 shown below, an X axis, a Y axis, and a Z axis are shown as three axes orthogonal to each other.

Hereinafter, a case where the physical quantity sensor 100 is an acceleration sensor that measures acceleration in the horizontal direction (X-axis direction) will be described.

As shown in FIGS. 1 to 4, the physical quantity sensor 100 includes a base substrate 10, a sensor substrate 80, and the lid body 60. The base substrate 10 includes multilayered film wirings 20, 22, and 24 made of the metal layer 32 and the noble metal layer 34, the adhesion layer 36, the insulating layer 38, and connection terminals 50, 52, and 54. The sensor substrate 80 includes a bonding pad 30 (note that the bonding pad 30 is not a discrete component but rather is an integral portion of the substrate 80), a silicide layer 31, anchors 81 and 82, springs 84 and 85, a movable mass 86, a movable electrode 87, a first fixed electrode 88 and a second fixed electrode 89.

The material of the base substrate 10 is, for example, an insulating material, specifically, it can be glass. As shown in FIG. 2, the base substrate 10 has a first surface (specifically, an upper surface) 11 and a second surface (specifically, a lower surface) 12 opposite to the first surface 11. In the illustrated example, the first surface 11 faces a +Z-axis direction, and the second surface 12 faces a −Z-axis direction. A recess 13 is provided in the first surface 11. Grooves 14, 15, and 16 are further provided in the first surface 11.

The movable mass 86 and the movable electrode 87 of the sensor substrate 80 are suspended above the recess (on the +Z-axis direction side). The recess 13 allows the movable mass 86 and the movable electrode 87 to move in a desired direction without being obstructed by the base substrate 10. The planar shape (shape when viewed from the Z-axis direction) of the recess 13 is not particularly limited, but in the example shown in FIG. 1, the shape is rectangular.

As shown in FIG. 1, the groove 14 is provided so as to extend along the outer periphery of the recess 13 in a plan view (viewed from the Z-axis direction). The groove 14 extends from the inside to the outside of a cavity 62 surrounded by the base substrate 10 and the lid body 60. The groove 14 has, for example, a planar shape corresponding to the planar shape of the wiring 20 and the connection terminal 50.

The groove 15 is provided so as to extend along the outer periphery of the recess 13 in a plan view. In the example shown in FIG. 1, the groove 15 is provided outside the groove 14 so as to surround the groove 14. The groove 15 extends from the inside to the outside of the cavity 62. The groove 15 has, for example, a planar shape corresponding to the planar shape of the wiring 22 and the connection terminal 52.

The groove 16 extends from the inside to the outside of the cavity 62. The groove 16 has, for example, a planar shape corresponding to the planar shape of the wiring 24 and the connection terminal 54.

A plurality of projections 18 are provided in the grooves 14, 15, and 16, and the wirings 20, 22, and 24 provided on the projections 18 and the sensor substrate 80 are electrically connected via the silicide layer 31.

The wirings 20, 22, and 24 are provided in the grooves 14, 15, and 16 and on each projection 18 provided in the grooves 14, 15, and 16.

The wiring 20 is provided in the groove 14. More specifically, the wiring 20 is made of the metal layer 32 and the noble metal layer 34 and is provided on a bottom surface (the surface of the base substrate 10 defining the groove 14) 14a of the groove 14. As shown in FIG. 3, the wiring 20 is electrically connected to the first fixed electrode 88 of the sensor substrate 80 via the silicide layer 31 of the bonding pad 30 on the projection 18 provided in the groove 14.

The wiring 22 is provided in the groove 15. More specifically, the wiring 22 is made of the metal layer 32 and the noble metal layer 34 and is provided on a bottom surface 15a of the groove 15. The wiring 22 is electrically connected to the second fixed electrode 89 of the sensor substrate 80 via the silicide layer 31 of the bonding pad 30 on the projection 18 provided in the groove 15.

The wiring 24 is provided in the groove 16. More specifically, the wiring 24 is made of the metal layer 32 and the noble metal layer 34 and is provided on a bottom surface 16a of the groove 16. As shown in FIG. 4, the wiring 24 is electrically connected to the first anchor 81 of the sensor substrate 80 via the silicide layer 31 of the bonding pad 30 on the projection 18 provided in the groove 16.

The thickness (size in the Z-axis direction) of the wirings 20, 22, and 24 is, for example, 20 nm or more and 1 μm or less, the thickness of the metal layer 32 is, for example, 10 nm or more and 800 nm or less, the thickness of the noble metal layer 34 is, for example, 10 nm or more and 200 nm or less. By setting the thickness of the noble metal layer 34 to 10 nm or more, a sufficient continuous film may be formed, and electrical connection between the sensor substrate 80 and the wirings 20, 22, and 24 may be secured. In addition, by setting the thickness of the noble metal layer 34 to 200 nm or less, voids due to excessive silylation are hardly generated, and disconnection at the corners of the projection 18 is hardly caused, and therefore, it is possible to sufficiently secure electrical connection between the sensor substrate 80 and the wirings 20, 22, and 24.

The material of the metal layer 32 in the material of the wirings 20, 22, and 24 is, for example, Indium Tin Oxide (ITO), Fluorine-doped Tin Oxide (FTO), and Ga doped ZnO, Al, Au, Pt, Ti, W, and Cr. The material of the noble metal layer 34 is, for example, one of Ru, Pt, Pd, Ir, Rh, and Os, or a plurality (combination) of these materials. Therefore, the sensor substrate 80 and the silicide layer 31 may be formed, and the bonding pad 30 of the sensor substrate 80 and the noble metal layer 34 of the wirings 20, 22, and 24 may be electrically connected.

The silicide layer 31 is provided between the bonding pad 30 of the sensor substrate 80 and the wirings 20, 22, and 24 and connects the bonding pad 30 of the sensor substrate 80 and the wirings 20, 22, and 24. More specifically, the silicide layer 31 is formed between the bonding pad 30 of the first fixed electrode 88 and the wiring 20, between the bonding pad 30 of the second fixed electrode 89 and the wiring 22, and between the bonding pad 30 of the first anchor 81 and the wiring 24.

The silicide layer 31 is formed by silicon (silicon of a silicon substrate 80a which will become the sensor substrate 80) at the bonding pad 30 of the sensor substrate 80 reacting with the noble metal layer 34 of the wirings 20, 22, and 24. More specifically, at the time of anodically bonding the silicon substrate 80a (see FIG. 8) to be the sensor substrate 80 and the base substrate 10, silicon at the bonding pad 30 of the silicon substrate 80a reacts with the noble metal layer 34, thereby forming the silicide layer 31. The thickness of the silicide layer 31 is not particularly limited, is appropriately determined depending on the thickness of the noble metal layer 34, anodic bonding conditions (temperature and time), and the like, and is, for example, 10 nm or more and 200 nm or less.

The adhesion layer 36 is provided so as to cover a part of the wirings 20, 22, and 24. More specifically, the adhesion layer 36 is provided so as to cover the projection 18 as shown in FIG. 3, or cover the wirings 20, 22, and 24 as shown in FIG. 4. The material of the adhesion layer 36 is, for example, one of Ti, TiW, W, TiN, Ta, TaW, TaN, Ni, and Co, or a plurality (combination) of these materials. The adhesion layer 36 may enhance the adhesion between the noble metal layer 34 and the insulating layer in the wirings 20, 22, and 24, and peeling of the insulating layer 38 due to heat generated at the time of bonding the substrates to each other or mounting onto the external substrate may be reduced. The thickness of the adhesion layer 36 is, for example, 10 nm or more and 200 nm or less.

The insulating layer 38 is provided so as to cover the adhesion layer 36. More specifically, the insulating layer 38 is stacked on the adhesion layer 36 but does not cover the projections 18 or an area where the connection terminals 50, 52, and 54 are disposed. The material of the insulating layer 38 is, for example, one of $SiO_2$, SiOF, SiOC, SiON, SiH, $HfO_2$, $Al_2O_3$, $La_2O_3$, $TiO_2$, $Ta_2O_5$, and DLC (Diamond•Like•Carbon), or a plurality (combination) of these materials. The insulating layer 38 may prevent foreign matter from adhering to the wirings 20 and 22 and short-circuiting between the wirings 20 and 22 and the fixed electrode. The thickness of the insulating layer 38 is, for example, 10 nm or more and 300 nm or less.

Accordingly, as shown in FIG. 3, at each projection 18 provided in the grooves 14, 15, and 16, the noble metal layer 34 covers the projection 18 and the face of the metal layer 34 in contact with the bonding pad 30 forms the silicide layer 31, and the metal layer 32 extends between the noble metal layer 34 and the base substrate 10. In addition, the metal layer 32, the noble metal layer 34, the adhesion layer 36, and the insulating layer 38 are stacked in this order from the base substrate 10 side in all areas except for atop the projection 18.

The connection terminals 50, 52, and 54 are provided in the grooves 14, 15, and 16, respectively. The connection terminals 50, 52, and 54 are connected to the wirings 20, 22, and 24, respectively. Therefore, the connection terminal 50 is electrically connected to the first fixed electrode 88. The connection terminal 52 is electrically connected to the second fixed electrode 89. The connection terminal 54 is electrically connected to the first anchor 81.

The connection terminals 50, 52, and 54 are provided (on the outside of the cavity 62) at a position not overlapping with the lid body 60 in a plan view. Materials of the connection terminals 50, 52, and 54 are, for example, the same as the wirings 20, 22, 24.

The lid body 60 is mounted (bonded) on the base substrate 10 (on the first surface 11). The lid body 60 has a container-like shape, and the cavity 62 may be formed by being bonded to the base substrate 10. For example, a gap 2 (gap in the groove 16) between the insulating layer 38 and the lid body 60 shown in FIG. 4 may be filled with an adhesive member (not shown) or the like, and in this case, the cavity 62 may be hermetically sealed in an inert gas (for example, nitrogen gas) atmosphere.

The material of the lid body 60 is, for example, silicon, glass, or the like. The method of bonding the lid body 60 and the base substrate 10 is not particularly limited. For example, in a case where the material of the base substrate 10 is glass and the material of the lid body 60 is silicon, the base substrate 10 and the lid body 60 may be anodically bonded.

The sensor substrate 80 is supported (on the first surface 11) on the base substrate 10. The sensor substrate 80 is housed in the cavity 62. The material of the sensor substrate 80 is silicon to which conductivity is imparted by doping impurities such as phosphorus and boron.

The movable mass 86 of the sensor substrate 80 is displaced in the X-axis direction (+X-axis direction or −X-axis direction) while elastically deforming the springs 84 and 85 according to the change in the acceleration in the X-axis direction. With such displacement, the sizes of the gaps between the movable electrode 87 and the first fixed electrode 88 and the gaps between the movable electrode 87 and the second fixed electrode 89 change. That is, with such displacement, the magnitudes of the electrostatic capacitance between the movable electrode 87 and the first fixed electrode 88 and the electrostatic capacitance between the movable electrode 87 and the second fixed electrode 89 change. The physical quantity sensor 100 may measure the acceleration in the X-axis direction based on the change in the electrostatic capacitance.

The first anchor 81 and the second anchor 82 are bonded to the first surface 11 of the base substrate 10. In the example shown in FIG. 1, the anchors 81 and 82 are provided so as to straddle the outer peripheral edge of the recess 13 in a plan view. The planar shape of the anchors 81 and 82 is, for example, rectangular.

The first anchor 81 is provided so as to straddle the groove 16. In the example shown in FIG. 1, a part of the first anchor 81 overlaps with the groove 16. As shown in FIG. 4, the first anchor 81 is electrically connected to the connection terminal 54 via the silicide layer 31 and the wiring 24.

As shown in FIG. 1, the movable mass 86 is provided between the first anchor 81 and the second anchor 82. In the example shown in FIG. 1, the planar shape of the movable mass 86 is a rectangle having a long side along the X axis.

The springs 84 and 85 connect the movable mass 86 and the anchors 81 and 82. More specifically, the first spring 84 connects the movable mass 86 and the first anchor 81, and the second spring 85 connects the movable mass 86 and the second anchor 82. The springs 84 and 85 have a desired spring constant and are configured to displace the movable mass 86 in the X-axis direction. In the example shown in FIG. 1, the first spring 84 is constituted by two beams 84a and 84b having a serpentine shape extending in the X-axis direction while reciprocating in the Y-axis direction. Likewise, the second spring 85 is constituted by two beams 85a and 85b having a serpentine shape extending in the X-axis direction while reciprocating in the Y-axis direction.

The movable electrode 87 is connected to the movable mass 86. The movable electrode 87 is provided on the movable mass 86. A plurality of movable electrodes 87 are provided. The movable electrode 87 protrudes in the +Y-axis direction and the −Y-axis direction from the movable mass 86 and is arranged in the X-axis direction so as to form a comb teeth shape.

The fixed electrodes 88 and 89 are provided on the base substrate 10 and are arranged to face the movable electrode 87. One end of each of the fixed electrodes 88 and 89 is bonded to the first surface 11 of the base substrate 10 as a fixed end and the other end thereof extends to the movable mass 86 side as a free end. A plurality of fixed electrodes 88 and 89 are provided. The fixed electrodes 88 and 89 are alternately arranged in the X-axis direction so as to form a comb teeth shape. The fixed electrodes 88 and 89 are provided to be opposed to the movable electrode 87 with a space therebetween. In the example shown in FIG. 1, the first fixed electrode 88 is disposed on one side (the −X-axis direction side) of the movable electrode 87, and the second fixed electrode 89 is disposed on the other side (the +X-axis direction side). For example, the area of the first fixed electrode 88 that faces the movable electrode 87 is the same as the area that faces the movable electrode 87 of the second fixed electrode 89.

The first fixed electrode 88 is provided so as to straddle the grooves 14 and 15. In the example shown in FIG. 1, the first fixed electrode 88 crosses the grooves 14 and 15. The first fixed electrode 88 is electrically connected to the connection terminal 50 via the silicide layer 31 and the wiring 20.

The second fixed electrode 89 is provided so as to straddle the grooves 14 and 15. In the example shown in FIG. 1, the second fixed electrode 89 crosses the grooves 14 and 15. The second fixed electrode 89 is electrically connected to the connection terminal 52 via the silicide layer 31 and the wiring 22. The second fixed electrode 89 is electrically separated from the first fixed electrode 88.

The anchors 81 and 82, the springs 84 and 85, the movable mass 86, and the movable electrode 87 are integrally provided. The method for bonding the anchors 81 and 82, the fixed electrodes 88 and 89, and the base substrate 10 is not particularly limited. For example, in a case where the material of the base substrate 10 is glass, the anchors 81 and 82, the fixed electrodes 88 and 89, and the base substrate 10 are anodically bonded.

In the physical quantity sensor 100, the electrostatic capacitance between the movable electrode 87 and the first fixed electrode 88 may be measured by using the connection terminals 50 and 54. Furthermore, in the physical quantity sensor 100, the electrostatic capacitance between the movable electrode 87 and the second fixed electrode 89 may be measured by using the connection terminals 52 and 54. As described above, in the physical quantity sensor 100, the electrostatic capacitance between the movable electrode 87 and the first fixed electrode 88 and the electrostatic capacitance between the movable electrode 87 and the second fixed electrode 89 may be separately measured, and it is possible to measure the physical quantity (acceleration) with high accuracy based on the measurement results.

More specifically, the electrostatic capacitance between the movable electrode 87 and the first fixed electrode 88 and the electrostatic capacitance between the movable electrode 87 and the second fixed electrode 89 are monitored and differential measurement is performed, and therefore, it is possible to measure acceleration with high accuracy.

In the above description, the physical quantity sensor 100 is described as an acceleration sensor that measures the acceleration in the X-axis direction, but the physical quantity sensor 100 according to the invention may be an acceleration sensor that measures acceleration in the Y-axis direction or an acceleration sensor that measures acceleration in the vertical direction (Z-axis direction). In addition, the physical quantity sensor 100 according to the invention is not limited to an acceleration sensor and may be a gyro sensor that measures angular velocity, for example.

The physical quantity sensor 100 according to the first embodiment has the following features, for example.

According to the physical quantity sensor 100, since the wirings 20, 22, and 24 provided on the projections 18 are multilayered films of the noble metal layer 34 and the metal layer 32 forming the silicide layer 31, it is possible to adjust the thickness of the noble metal layer 34 and the metal layer 32. Therefore, by thickening the metal layer 32, the noble metal layer 34 may be thinned, and therefore, excessive silylation does not occur and there are fewer moving atoms. Therefore, since no void is generated in the silicide layer 31, cracking hardly occurs, and the reliability of the electrical connection between the sensor substrate 80 and the wirings 20, 22, and 24 may be improved. In addition, since it is possible to thicken the metal layer 32, the occurrence of disconnection at the corners of the projections 18 is reduced, and the reliability of the electrical connection between the sensor substrate 80 and the wirings 20, 22, and 24 may be improved. Furthermore, since the insulating layer 38 is formed on the noble metal layer 34 via the adhesion layer 36, it is possible to improve the adhesion between the insulating layer 38 and the noble metal layer 34 and reduce the peeling of the insulating layer 38 due to heat generated at the time of bonding the substrates to each other or at the time of mounting onto the external substrate. Therefore, it is possible to obtain the physical quantity sensor 100 having high reliability.

In addition, since the thickness of the noble metal layer 34 is, for example, 10 nm or more and 200 nm or less and the thickness of the noble metal layer 34 is 10 nm or more, it is possible to form a sufficient continuous film and secure the electrical connection between the sensor substrate 80 and the wirings 20, 22, and 24. In addition, the thickness of the noble metal layer 34 is 200 nm or less, voids due to excessive silylation are hardly generated, and disconnection at the corner portions of the projections 18 is hardly caused, and therefore, it is possible to secure the electrical connection between the sensor substrate 80 and the wirings 20, 22, and 24 via the silicide layer 31.

Method for Manufacturing Physical Quantity Sensor

Next, a method of manufacturing the physical quantity sensor 100 according to the first embodiment will be described with reference to FIGS. 5 to 8. FIGS. 5 to 8 are cross-sectional views schematically showing a manufacturing process of the physical quantity sensor 100 according to the first embodiment and correspond to FIG. 3.

Figure 5:
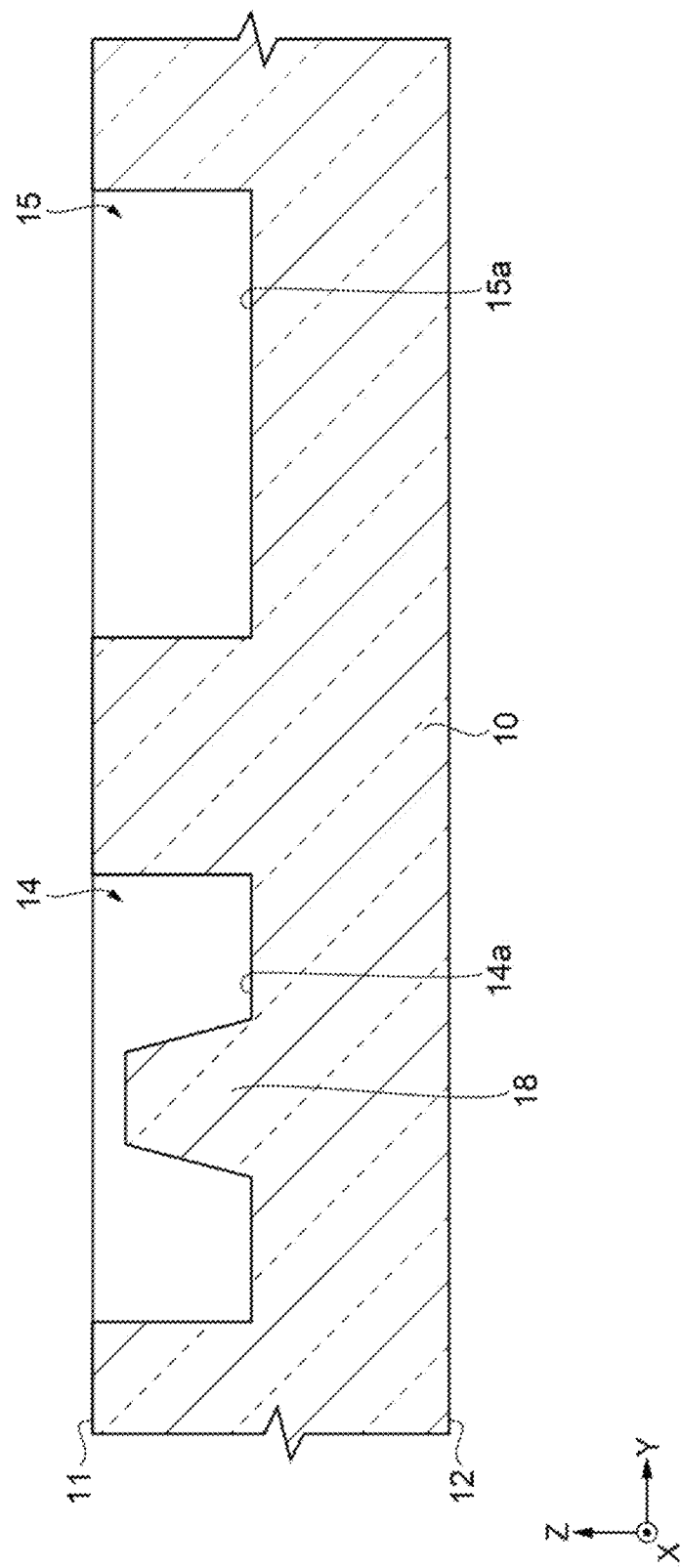
FIG. 5 is a cross-sectional view schematically showing a manufacturing process of the physical quantity sensor according to a first embodiment.

As shown in FIG. 5, the base substrate 10 is provided with the recess 13, the grooves 14, 15, and 16, and the projections 18 (see FIGS. 2 and 4). The recess 13, the grooves 14, 15, and 16, and the projections 18 are formed by, for example, a photolithography technique and an etching technique.

Figure 6:
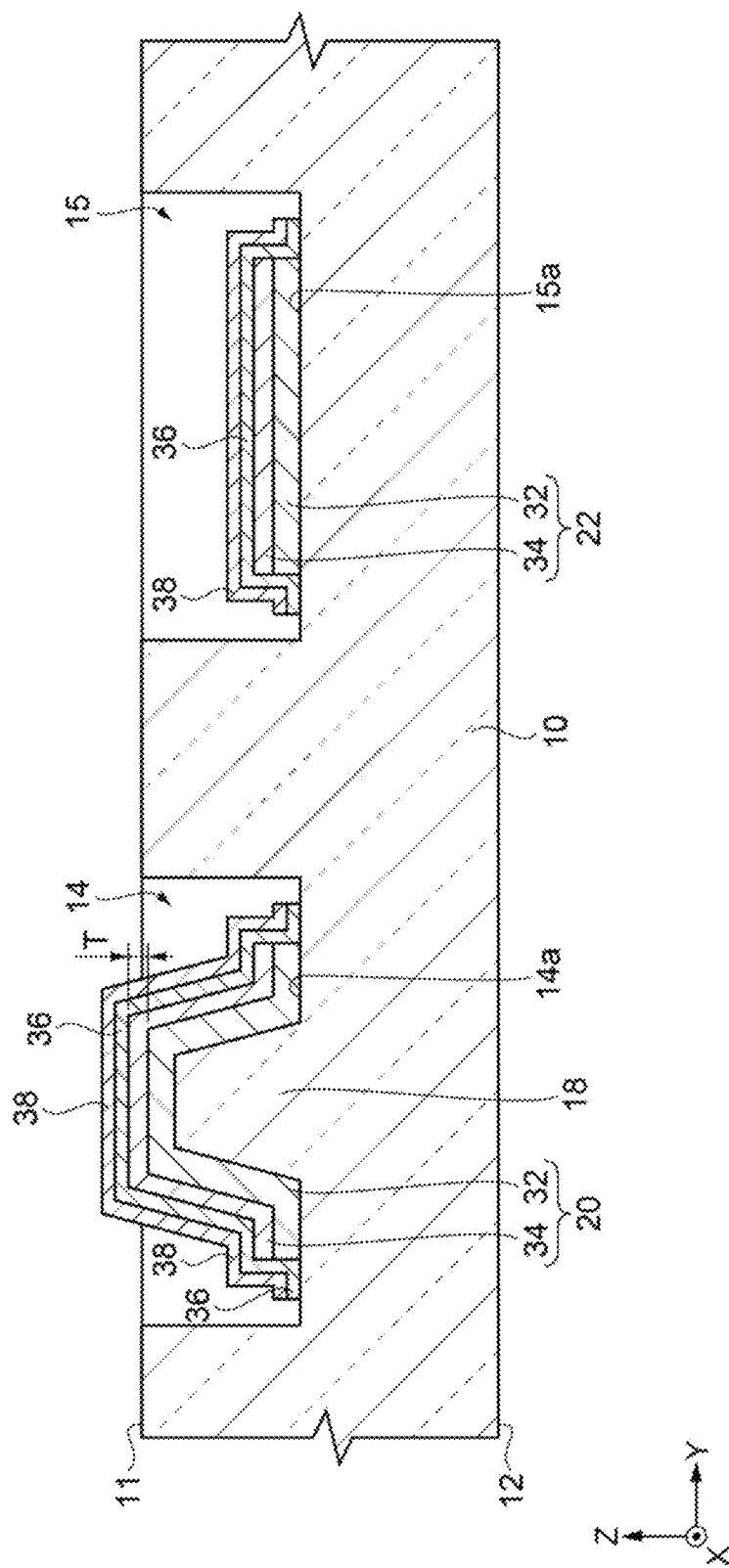
FIG. 6 is a cross-sectional view schematically showing a manufacturing process of the physical quantity sensor according to a first embodiment.

First, as shown in FIG. 6, the wirings 20, 22, and 24 are formed in the grooves 14, 15, and 16, respectively, by depositing the metal layer 32 and the noble metal layer 34 in this order. The metal layer 32 and the noble metal layer 34 are formed by, for example, a film deposition by a sputtering method or a chemical vapor deposition (CVD) method, a patterning by a photolithography technique and an etching technique, and a forming method by a lift-off method or the like. The thickness of the metal layer 32 is, for example, 10 nm or more and 800 nm or less, and a thickness T of the noble metal layer 34 is, for example, 10 nm or more and 200 nm or less.

Next, the adhesion layer 36 and the insulating layer 38 are formed in this order on the wirings 20, 22, and 24 by deposition. The adhesion layer 36 and the insulating layer 38 are formed by, for example, a film deposition by a sputtering method or a CVD method and a patterning by a photolithography technique and an etching technique. The thickness of the adhesion layer 36 is, for example, 10 nm or more and 200 nm or less, and the thickness of the insulating layer 38 is, for example, 10 nm or more and 300 nm or less.

Figure 7:
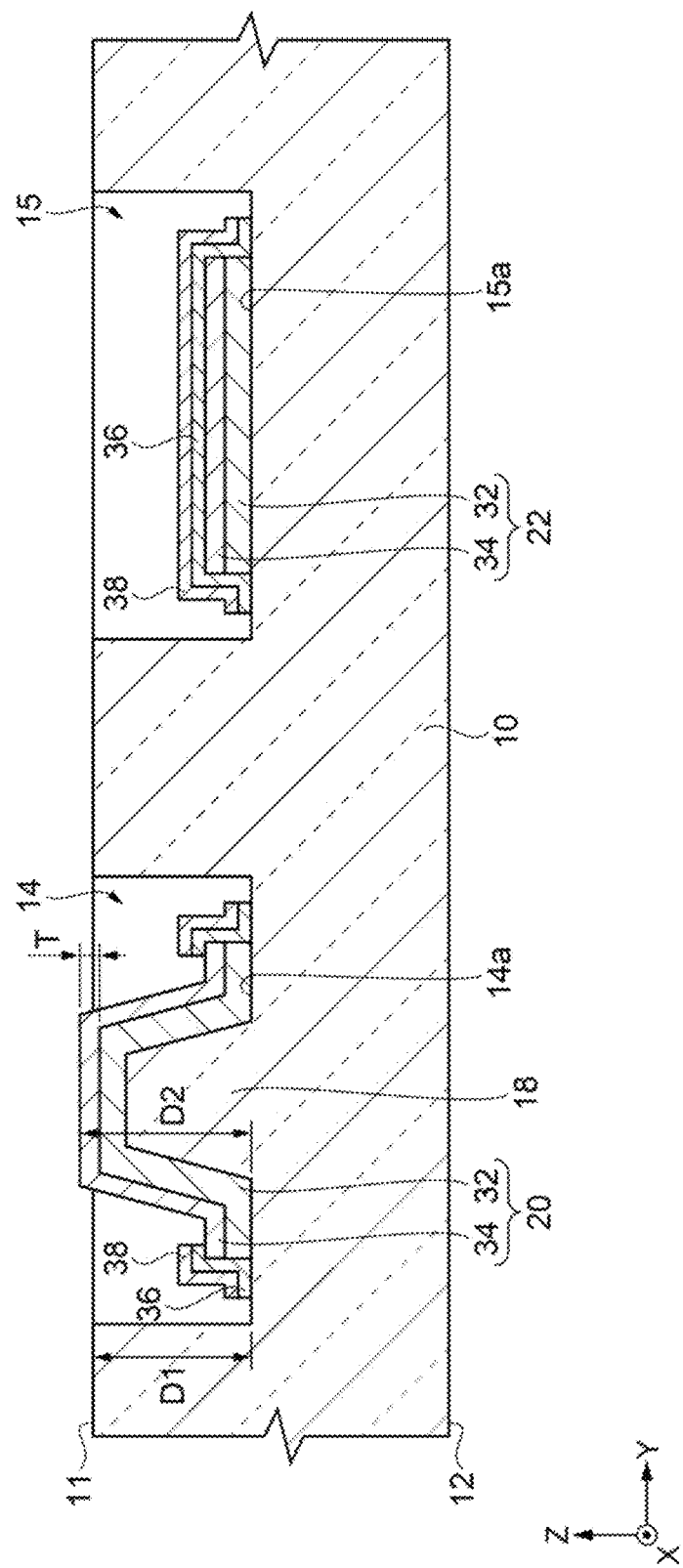
FIG. 7 is a cross-sectional view schematically showing a manufacturing process of the physical quantity sensor according to a first embodiment.

Next, as shown in FIG. 7, the insulating layer 38 in an area covering the projections 18 and an area where the connection terminals 50, 52, and 54 (see FIG. 1) are formed is removed. Removal of the insulating layer 38 is performed by a photolithography technique and an etching technique.

Here, on the projections 18, the noble metal layer 34 at a position facing (e.g., destined to face) the bonding pad 30 of the sensor substrate 80 is formed so as to protrude upward (+Z-axis direction side) relative to the first surface 11 of the base substrate 10. That is, the metal layer 32 and the noble metal layer 34 are formed so that a total thickness (height) D2 of the thickness (height) of the projection 18, the thickness of the metal layer 32, and the thickness of the noble metal layer 34 is set larger than a depth D1 of the groove 14. The projection 18 of the groove 15 and the projection 18 of the groove 16 have the same configuration. With such a configuration, when bonding the sensor substrate 80 onto the base substrate 10, the noble metal layer 34 on the projection 18 and the silicon at the bonding pad 30 of the sensor substrate 80 may be reliably brought into contact, and the silicide layer 31 may be formed at the bonding pad 30 of the sensor substrate 80.

Next, the connection terminals 50, 52, and 54 (see FIG. 1) are formed on the wirings 20, 22, and 24, respectively. The connection terminals 50, 52, and 54 are formed in the same manner as the wirings 20, 22, and 24, for example.

Figure 8:
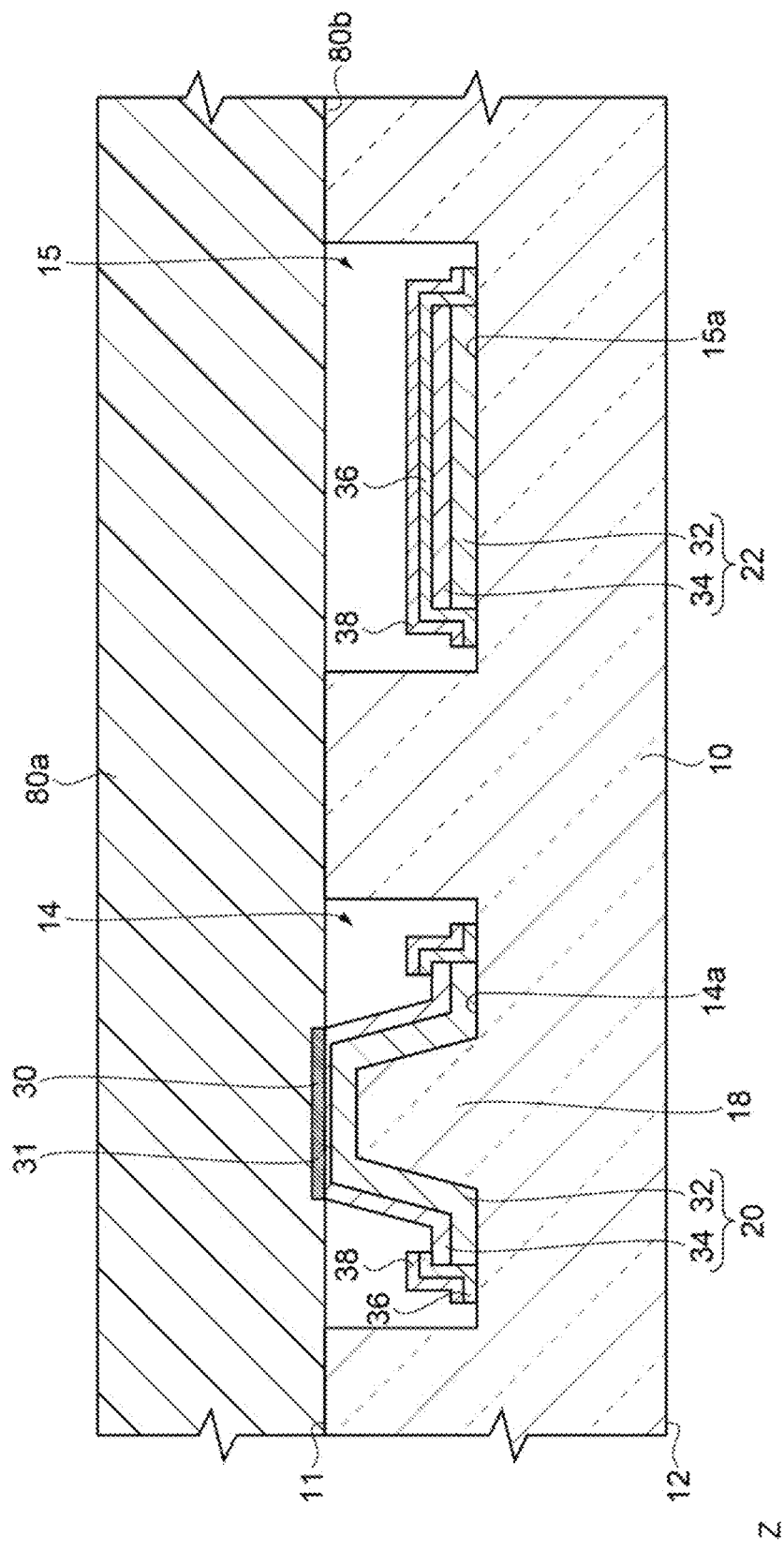
FIG. 8 is a cross-sectional view schematically showing a manufacturing process of the physical quantity sensor according to a first embodiment.

As shown in FIG. 8, the silicon substrate 80a is prepared, and the silicon substrate 80a is mounted on the base substrate 10 so that the noble metal layer 34 and the bonding pad 30 of the silicon substrate 80a come into contact with each other. Next, the base substrate 10 and the silicon substrate 80a are bonded. More specifically, the first surface 11 of the base substrate 10 and a third surface (the surface facing in the −Z-axis direction in the illustrated example) 80b of the silicon substrate 80a are anodically bonded. During the anodic bonding, silicon at the bonding pad 30 of the silicon substrate 80a diffuses into the noble metal layer 34, and the noble metal layer 34 diffuses into the bonding pad 30 of the silicon substrate 80a. Then, silicon at the bonding pad 30 of the silicon substrate 80a may react with, for example, Pt (platinum) of the noble metal layer 34 to form the silicide layer (platinum silicide layer) 31.

As shown in FIGS. 2 and 3, the silicon substrate 80a is ground by, for example, a grinding machine to form a thin film, and then patterned into a desired shape to form a sensor substrate 80. Patterning is performed by a photolithography technique and an etching technique (dry etching), and the Bosch method may be used as a more specific etching technique. In this process, the anchors 81 and 82, the springs 84 and 85, the movable mass 86, and the movable electrode 87 may be integrally formed by patterning (etching) the silicon substrate 80a.

As shown in FIG. 2, the lid body 60 is bonded to the base substrate 10, and the sensor substrate 80 is housed in the cavity 62 formed by the base substrate 10 and the lid body 60. Bonding between the base substrate 10 and the lid body 60 is performed by using, for example, anodic bonding, an adhesive, or the like. By performing this process in an inert gas atmosphere, it is possible to fill the cavity 62 with inert gas.

Through the above process, the physical quantity sensor 100 according to the first embodiment may be manufactured.

SECOND EMBODIMENT

Figure 9:
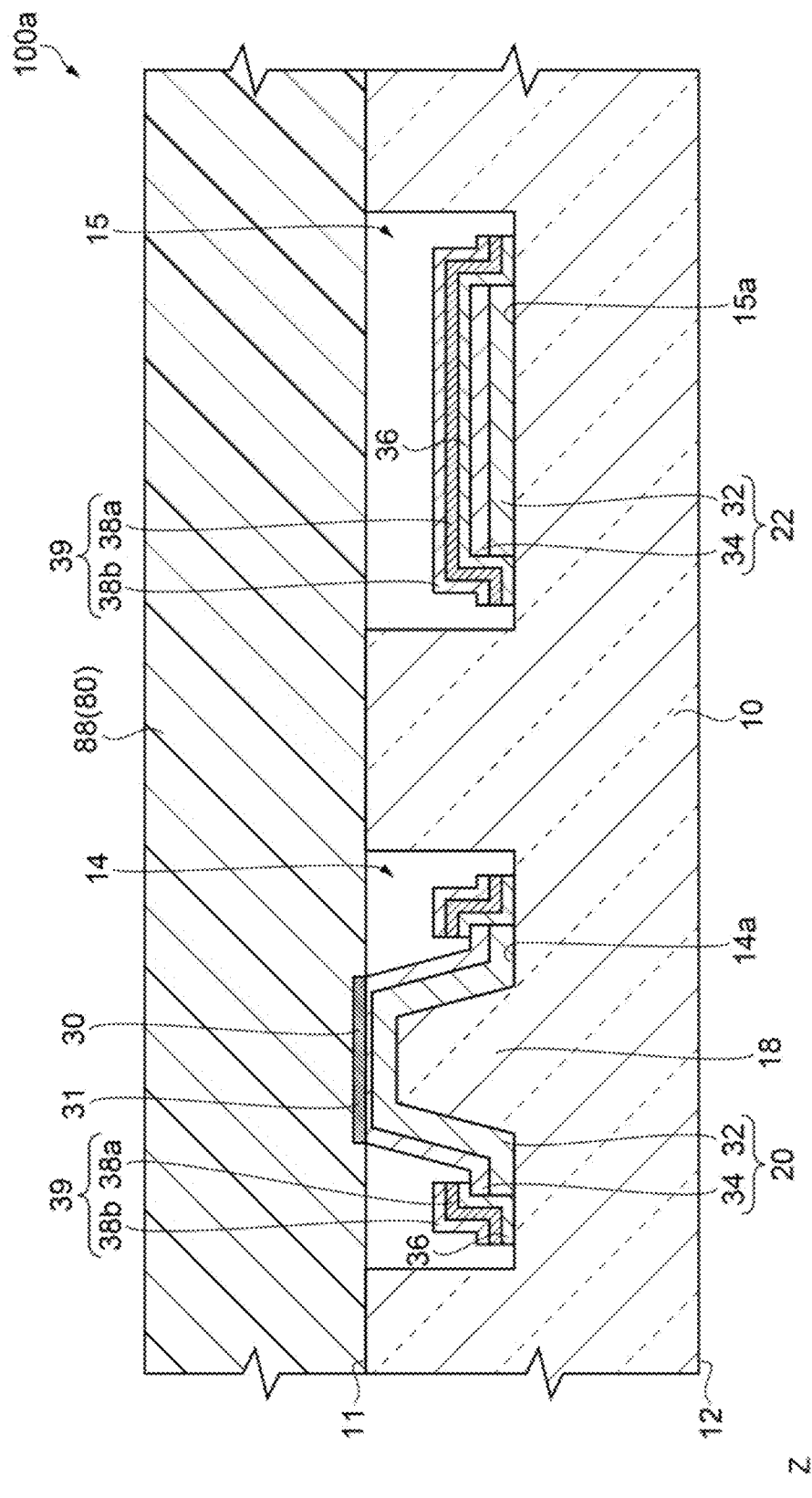
FIG. 9 is a cross-sectional view schematically showing a physical quantity sensor according to a second embodiment.

Next, a physical quantity sensor 100a according to a second embodiment will be described with reference to FIG. 9. FIG. 9 is a cross-sectional view schematically showing a schematic structure of the physical quantity sensor 100a according to the second embodiment and corresponds to FIG. 3. Hereinafter, in the physical quantity sensor 100a according to the second embodiment, points different from the example of the physical quantity sensor 100 according to the first embodiment will be described, and description of similar points will be omitted.

In the physical quantity sensor 100, as shown in FIG. 3, the insulating layer 38 is constituted by one layer. On the other hand, in the physical quantity sensor 100a, as shown in FIG. 9, the insulating layer 39 is constituted by two layers.

The insulating layer 39 is provided by stacking a first insulating layer 38a and a second insulating layer 38b on the adhesion layer 36. In a case where the sensor substrate 80 is formed by etching, it is possible to improve etching resistance by forming the insulating layer 39 in a two-layer structure. In addition, it is possible to relieve the residual stress between the first insulating layer 38a and the second insulating layer 38b and reduce warping of the base substrate 10 by combining the first insulating layer 38a and the second insulating layer 38b having different materials.

According to the physical quantity sensor 100a, since the insulating layer 39 is constituted by two layers of the first insulating layer 38a and the second insulating layer 38b, in a case where the sensor substrate 80 is formed by etching, it is possible to improve etching resistance. In addition, it is possible to relieve the residual stress of the insulating layer 39 and reduce the warping of the base substrate 10 by forming the insulating layer 39 with two layers using the first insulating layer 38a and the second insulating layer 38b having different materials.

Electronic Device

Figure 10:
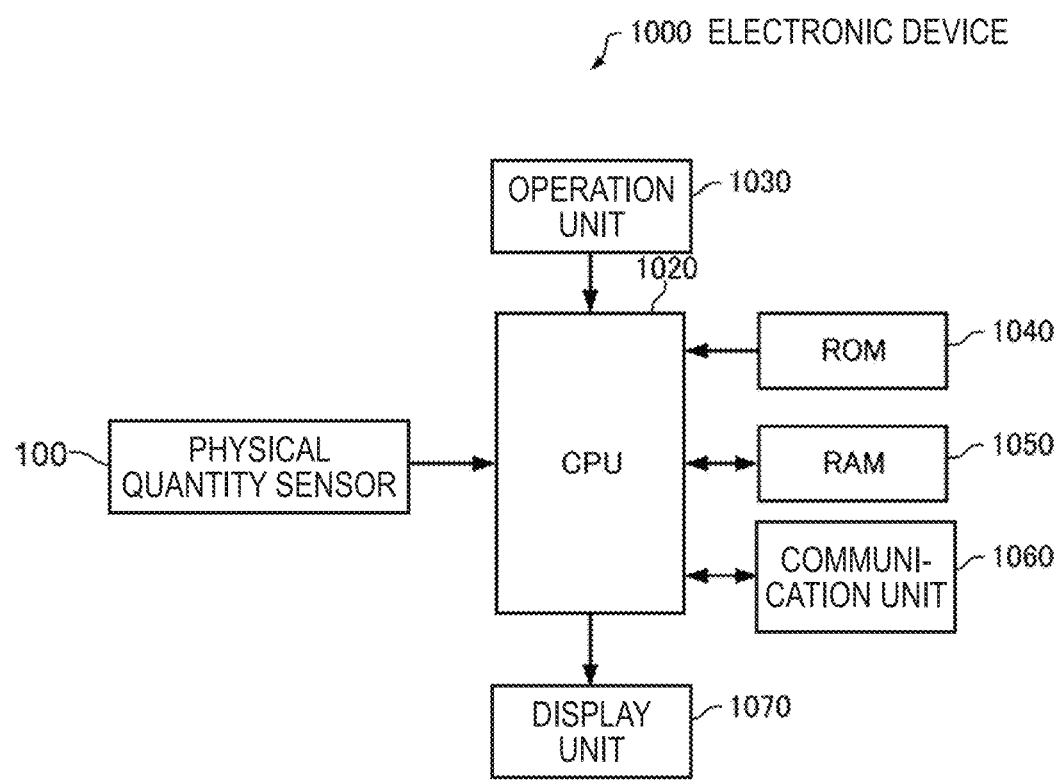
FIG. 10 is a functional block diagram of an electronic device according to an embodiment of the invention.

Next, an electronic device 1000 according to the embodiment will be described with reference to drawings. FIG. 10 is a functional block diagram of the electronic device 1000 according to the embodiment.

The electronic device 1000 includes the physical quantity sensors 100 and 100a according to the invention. Hereinafter, a case where the physical quantity sensor 100 according to the invention is included will be described.

The electronic device 1000 further includes an arithmetic processing unit (CPU) 1020, an operation unit 1030, a read-only memory (ROM) 1040, a random-access memory (RAM) 1050, a communication unit 1060, and a display unit 1070. The electronic device 1000 of the embodiment may be configured such that part of the components (each unit) in FIG. 10 is omitted or changed, or other components are added.

The arithmetic processing unit 1020 performs various calculation processing and control processing according to a program stored in the ROM 1040 or the like. More specifically, the arithmetic processing unit 1020 performs various processing according to the output signal of the physical quantity sensor 100, the operation signal from the operation unit 1030, processing of controlling the communication unit 1060 to perform data communication with an external device, and processing of transmitting a display signal for displaying various kinds of information on the display unit 1070.

The operation unit 1030 is an input device constituted by operation keys, button switches, and the like and outputs an operation signal corresponding to an operation by a user to the arithmetic processing unit 1020.

The ROM 1040 stores programs, data, and the like for the arithmetic processing unit 1020 to perform various calculation processing and control processing.

The RAM 1050 is used as a work area of the arithmetic processing unit 1020 and temporarily stores programs and data read from the ROM 1040, data input from the physical quantity sensor 100, data input from the operation unit 1030, calculation results executed by the arithmetic processing unit 1020 according to various programs, and the like.

The communication unit 1060 performs various controls for establishing data communication between the arithmetic processing unit 1020 and the external device.

The display unit 1070 is a display device constituted by a liquid crystal display (LCD) and the like and displays various kinds of information based on a display signal input from the arithmetic processing unit 1020. A touch panel functioning as the operation unit 1030 may be provided on the display unit 1070.

As the electronic device 1000, various kinds of electronic devices are conceivable, such as personal computers (for example, a mobile type personal computer, a laptop type personal computer, and a tablet type personal computer), mobile terminals such as smart phones and mobile phones, digital still cameras, ink jet type ejecting apparatuses (for example, an ink jet printer), storage area network devices such as routers and switches, local area network devices, devices for mobile terminal base stations, televisions, video cameras, video recorders, car navigation devices, real time clock device, pager, electronic notebooks (communication function included), electronic dictionaries, calculators, electronic game devices, game controllers, word processors, workstations, video phones, TV monitors for crime prevention, electronic binoculars, POS terminals, medical devices (for example, an electronic clinical thermometer, a blood pressure monitor, a blood glucose meter, an electrocardiogram measuring device, a ultrasonic diagnostic device, and an electronic endoscope), fish finders, various measuring instruments, instruments (for example, instruments of a vehicle, an aircraft, a ship), flight simulators, head mounted displays, motion tracers, motion trackers, motion controllers, PDRs (pedestrian position azimuth measurement), and the like.

Figure 11:
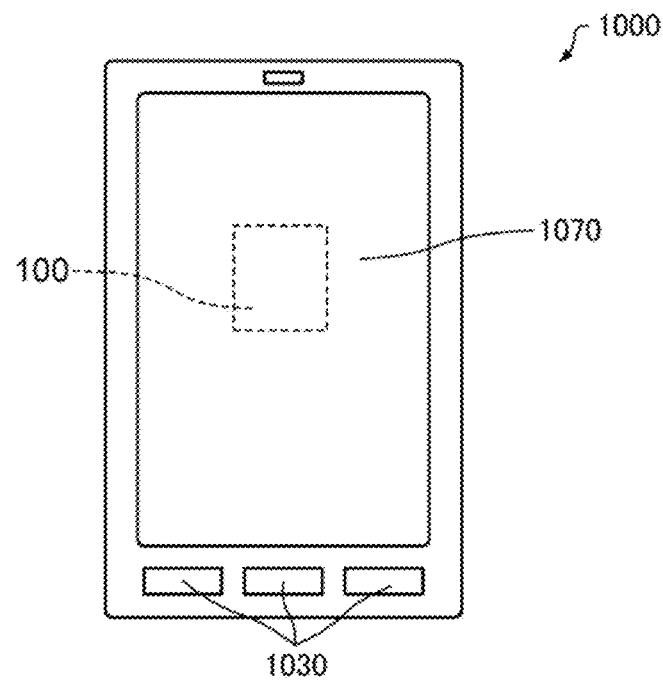
FIG. 11 is a plan view schematically showing an appearance of a smartphone which is an example of an electronic device according to an embodiment of the invention.

FIG. 11 is a diagram showing an example of an appearance of a smartphone which is an example of the electronic device 1000. A smartphone as the electronic device 1000 includes buttons as the operation unit 1030 and an LCD as the display unit 1070.

Figure 12:
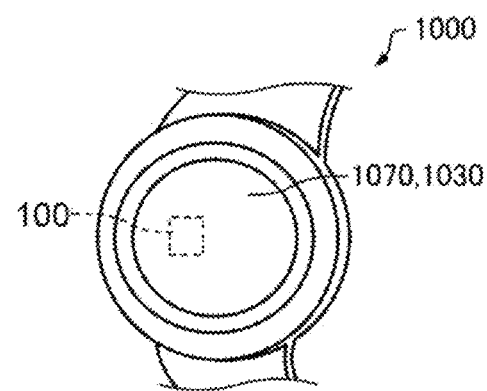
FIG. 12 is a perspective view schematically showing an appearance of a wearable device which is an example of an electronic device according to an embodiment of the invention.

FIG. 12 is a diagram showing an example of an appearance of a wrist-worn portable device (wearable device) which is an example of the electronic device 1000. The wearable device which is the electronic device 1000 includes an LCD as the display unit 1070. A touch panel functioning as the operation unit 1030 may be provided on the display unit 1070.

In addition, a mobile device, which is the electronic device 1000, has a position sensor such as a GPS receiver (GPS: Global Positioning System), for example, and may measure a moving distance and a movement trajectory of the user.

Vehicle

Figure 13:
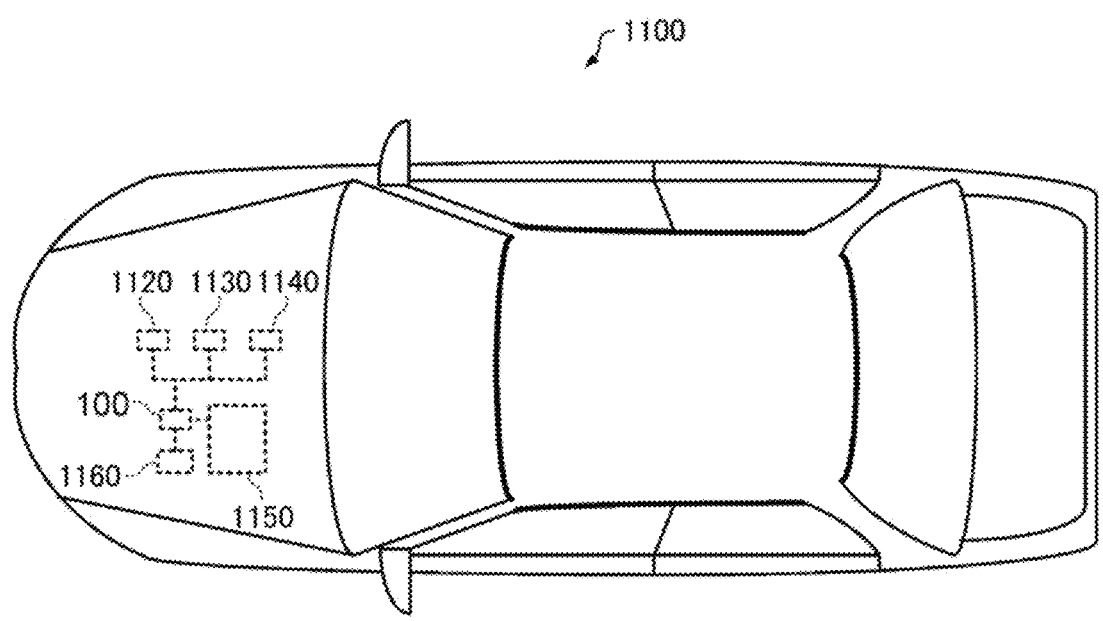
FIG. 13 is a plan view schematically showing a vehicle according to an embodiment of the invention.

Next, the vehicle 1100 according to the embodiment will be described with reference to drawings. FIG. 13 is a plan view schematically showing an automobile as the vehicle 1100 according to the embodiment.

The vehicle 1100 according to the embodiment includes the physical quantity sensors 100 and 100a according to the invention. Hereinafter, the vehicle 1100 including the physical quantity sensor 100 according to the invention will be described.

The vehicle 1100 according to the embodiment is configured to further include a controller 1120 that performs various controls such as an engine system, a brake system, a keyless entry system, and the like, a controller 1130, a controller 1140, a battery 1150, and a backup battery 1160. The vehicle 1100 according to the embodiment may be configured such that a part of the constituent elements (each unit) shown in FIG. 13 is omitted or changed, or other constituent elements are added.

As the vehicle 1100, various vehicles are conceivable, and examples thereof include an automobile (including an electric car), an aircraft such as a jet machine and a helicopter, a ship, a rocket, an artificial satellite, and the like.

The above-described embodiments and modification examples are merely examples, and the invention is not limited thereto. For example, it is also possible to combine each embodiment and each modification example as appropriate.

The invention includes substantially the same configuration as the configuration described in the embodiments (for example, a configuration having the same function, method, and result, or a configuration having the same object and effect). In addition, the invention includes a configuration in which non-essential parts of the configuration described in the embodiments are replaced. In addition, the invention includes a configuration that achieves the same effects as the configurations described in the embodiments or a configuration that may achieve the same object.

In addition, the invention includes a configuration in which well-known techniques are added to the configurations described in the embodiments.

The entire disclosure of Japanese Patent Application No. 2017-168289 filed Sep. 1, 2017 is expressly incorporated herein by reference.

What is claimed is:

1. A physical quantity sensor comprising:
a base substrate that includes a groove, the base substrate being an insulating material;
a projection in the groove;
a multilayered wiring on the projection;
a silicon sensor substrate coupled to the base substrate, the sensor substrate including a fixed electrode and a movable electrode configured to measure a physical quantity;
a bonding pad of the sensor substrate connected to the wiring on the projection;
a silicide layer electrically connecting the wiring on the projection and the bonding pad;
a noble metal layer of the wiring on the projection contacting the bonding pad via the silicide layer; and
a metal layer of the wiring on the projection separating the noble metal layer from the base substrate;
wherein the metal layer, the noble metal layer, an adhesion layer, and an insulating layer are stacked in this order from the base substrate in the groove except for over the projection,
a thickness of the metal layer is greater than that of the noble metal layer, and
each of the adhesion layer and the insulating layer overlap the substrate, and the adhesion layer is located between the substrate and the insulating layer.

2. The physical quantity sensor according to claim 1, wherein a thickness of the noble metal layer is 10 nm or more and 200 nm or less.

3. The physical quantity sensor according to claim 1, wherein the noble metal layer comprises one of Ru, Pt, Pd, Ir, Rh, and Os or a combination thereof.

4. The physical quantity sensor according to claim 1, wherein the insulating layer comprises one of $SiO_2$, SiOF, SiOC, SiON, SiH, $HfO_2$, $Al_2O_3$, $La_2O_3$, $TiO_2$, $Ta_2O_5$, and Diamond•Like•Carbon or a combination thereof.

5. The physical quantity sensor according to claim 1, wherein the adhesion layer comprises one of Ti, TiW, W, TiN, Ta, TaW, TaN, Ni, and Co or a combination thereof.

6. The physical quantity sensor according to claim 5, wherein the insulating layer further comprises a two layer structure.

7. An electronic device comprising:
the physical quantity sensor according to claim 1.

8. A vehicle comprising:
the physical quantity sensor according to claim 1.

9. A physical quantity sensor comprising:
a glass base substrate that includes a groove;
a projection upstanding in the groove;
a multilayered wiring in the groove and on the projection, the multilayered wiring including a metal layer covering the projection and extending onto the base substrate in the groove and a noble metal layer covering the metal layer and separated from contacting the base substrate in the groove by the metal layer, a thickness of the metal layer being greater than that of the noble metal layer;
a silicon sensor substrate coupled to the base substrate, the sensor substrate including a fixed electrode and a movable electrode configured to measure a physical quantity;
a bonding pad of the sensor substrate connected to the noble metal layer of the wiring on the projection;

a silicide layer including a diffused blend of the bonding pad and the noble metal layer electrically interconnecting the wiring on the projection and the bonding pad;

an adhesion layer covering the noble layer in the groove except for atop the projection; and an insulating layer covering the adhesion layer in the groove wherein each of the adhesion layer and the insulating layer overlap the substrate, and the adhesion layer is located between the substrate and the insulating layer.

10. The physical quantity sensor according to claim 9, wherein a thickness of the noble metal layer is 10 nm or more and 200 nm or less.

11. The physical quantity sensor according to claim 9, wherein the noble metal layer comprises one of Ru, Pt, Pd, Ir, Rh, and Os or a combination thereof.

12. The physical quantity sensor according to claim 9, wherein the insulating layer comprises one of $SiO_2$, SiOF, SiOC, SiON, SiH, $HfO_2$, $Al_2O_3$, $La_2O_3$, $TiO_2$, $Ta_2O_5$, and Diamond•Like•Carbon or a combination thereof.

13. The physical quantity sensor according to claim 9, wherein the adhesion layer comprises one of Ti, TiW, W, TiN, Ta, TaW, TaN, Ni, and Co or a combination thereof.

14. The physical quantity sensor according to claim 9, wherein the insulating layer comprises a two layer structure.

15. A physical quantity sensor comprising:

a glass base substrate that includes a plurality of grooves;

a plurality of projections upstanding in each of the grooves;

a multilayered wiring in each of the grooves and on each of the projections, each multilayered wiring including a metal layer covering the projections and extending onto the base substrate in the grooves and a noble metal layer covering the metal layer and separated from contacting the base substrate in the grooves by the metal layer, a thickness of the metal layer being greater than that of the noble metal layer;

a silicon sensor substrate coupled to the base substrate, the sensor substrate including a fixed electrode and a movable electrode configured to measure a physical quantity;

silicon bonding pads of the sensor substrate connected to the noble metal layers of the wirings on the projections;

silicide layers including diffused blends of the bonding pads and the noble metal layers electrically interconnecting the wirings on the projections and the bonding pads;

an adhesion layer covering the noble metal layers in the grooves except for atop the projections; and an insulating layer covering the adhesion layer in the grooves, the insulating layer comprising a two layer structure, wherein a thickness of the noble metal layers is 10 nm or more and 200 nm or less, and wherein each of the adhesion layer and the insulating layer overlap the substrate, and the adhesion layer is located between the substrate and the insulating layer.

16. The physical quantity sensor according to claim 15, wherein the noble metal layer comprises one of Ru, Pt, Pd, Ir, Rh, and Os or a combination thereof.

17. The physical quantity sensor according to claim 15, wherein the insulating layer comprises one of $SiO_2$, SiOF, SiOC, SiON, SiH, $HfO_2$, $Al_2O_3$, $La_2O_3$, $TiO_2$, $Ta_2O_5$, and Diamond•Like•Carbon or a combination thereof.

18. The physical quantity sensor according to claim 15, wherein the adhesion layer comprises one of Ti, TiW, W, TiN, Ta, TaW, TaN, Ni, and Co or a combination thereof.

* * * * *